April 7, 1953  J. D. GODFREY  2,633,837
FUEL PREHEATING AND MIXING DEVICE
Filed May 16, 1951

John David Godfrey
INVENTOR.

Patented Apr. 7, 1953

2,633,837

UNITED STATES PATENT OFFICE 2,633,837

FUEL PREHEATING AND MIXING DEVICE

John David Godfrey, Cincinnati, Ohio

Application May 16, 1951, Serial No. 226,695

3 Claims. (Cl. 123—119)

The present invention relates to certain new and useful improvements in ways and means whereby the efficiency of operation of an internal combustion engine may be better achieved while at the same time economizing on fuel, and has more particular reference to a simple and practical device which is installed in a downdraft conduit affording communication between a carburetor and complemental intake manifold.

More specifically, the invention appertains to a ready-to-install adapter which fits between the usual gasket-equipped flanges of the coacting carburetor and intake manifold parts. A perforated tube, called a preheater, is mounted in the adapter and this forcibly shoots exhaust gases into the air and gas mixture. The thus picked up gas is conveyed to and introduced in opposite ends of the preheater tube by way of branch pipes which latter are attached to forward and rear end portions of the usual exhaust manifold.

Novelty is predicated on an adapter with a tube spanning the usual circular opening in the adapter, the tube having a multiplicity of discharge holes therein and end portions of the tube extending beyond diametrically opposite sides of the margin of the adapter to accommodate the stated branch pipes.

Further novelty is predicated on creating an unusually novel turbulous action at the point of installation of the adapter by utilizing branch exhaust gas delivery pipes which attach to the exhaust manifold, one close to the front cylinder and one close to the rearmost cylinder, whereby to bring about an alternate source of impulses. The exhaust gases are thus alternately and forcibly fed into diametrically opposite sides of a distributing preheater tube and the turbulous activity and forces thus applied mix the exhaust gases with the air and fuel gases and, in addition, assist in "driving" the mixture down through the conduit or duct into the cylinders by way of the intake manifold.

Other objects and advantages will become more readily apparent from the following description and the accompanying sheet of illustrative drawings.

In the accompanying sheet of drawings wherein like numerals are employed to designate like parts throughout the views.

Figure 1:
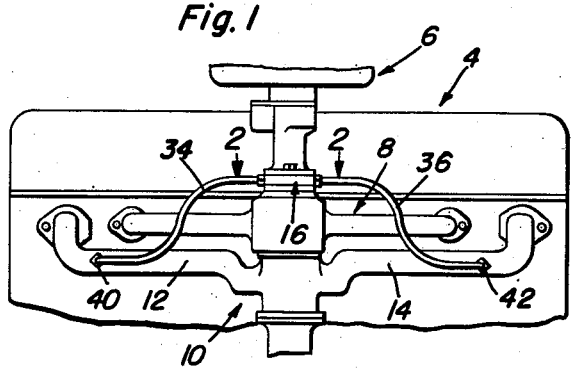
Figure 1 is a fragmentary side elevational view of significant portions of an internal combustion engine showing the attachments, the subject matter of the present invention, installed and ready for use.

Referring now to Figure 1, the internal combustion engine, as an over-all assembly, is denoted by the numeral 4. The overhead downdraft-type carburetor is denoted at 6 and the intake manifold means at 8 and the exhaust manifold means at 10. The forward and rearward branches, respectively, of the exhaust manifold are denoted by the numerals 12 and 14. These are, of course, on opposite sides of the conduit or passage in which the improved attachment means is installed. The means comprises a commonly shaped insert or adapter plate 16 having apertured lugs or end portions 18 and 20 whereby said adapter is bolted between the usual coacting flanges on the carburetor and intake manifold means, this as shown in Figure 1. The main body portion 22 has a circular passage 24 therein which registers with the passage in the stated conduit made up of the carburetor, intake manifold and exhaust manifold. The distributing, preheating and spray tube is denoted by the numeral 26 and this is a small tube which extends across the center of the opening 24 and has its end portions suitably mounted in passages 28—28 provided therefor in the body 22. The end portions of the tube extend to the exterior where they are threaded as at 30—30. The multiplicity of distributing and spraying holes are denoted at 32—32. Two duplicate pick-up and delivery pipes of small gauge are employed and these are denoted by the numerals 34 and 36, respectively. They are joined by suitable unions or couplings 38—38 with the threaded ends 30—30 of the preheater tube 26. These pipe lines are distinct in that they function in alternate progression. That is to say, the end 40 of the front pipe 34 is joined to the front branch 12 of the exhaust manifold within the vicinity of the foremost or front cylinder. On the other hand, the corresponding end of the pipe 36 is joined as at 42 to the rear end portion of the rear branch 14 of the exhaust manifold where it is in close proximity to the rearmost cylinder. The stronger impulses of these two cylinders alternately project gases under pressure first into the pipe 34 and then into the pipe 36. The minor impulses in the intermediate portions of the branches 12 and 14 function in between but it is the principal and forcible impulses with which we are here concerned because they not only pick up and shunt the exhaust gases into the conduit by way of the spray pipe 26 but produce sufficient explosive pressures in the region of the opening 24 to create a turbulous action. This turbulent effect not only better mixes the air and gas coming down through the conduit but a resultant product of fuel gas, air and heated exhaust gases is had. It has been found from experimentation that the extra pressure thus obtaining in this area plus the preheated and different mixture enables the attachment to function as a definite economy device, one which materially increases mileage because it utilizes heated exhaust gases plus regular fuel and brings about a greater and more efficient consumption of the over-all fuel product.

With the invention properly installed, one does not have to use high octane gasoline. In fact, cheap gasoline or even 50% fuel oil, such as used in diesel engines, will do. What is more, the user will observe no annoying knocks and "pings" climbing hills, no oily smoke from the exhaust pipe and will actually save on fuel and its cost and, despite it all, will note that the engine power is appreciably increased.

Figure 2:
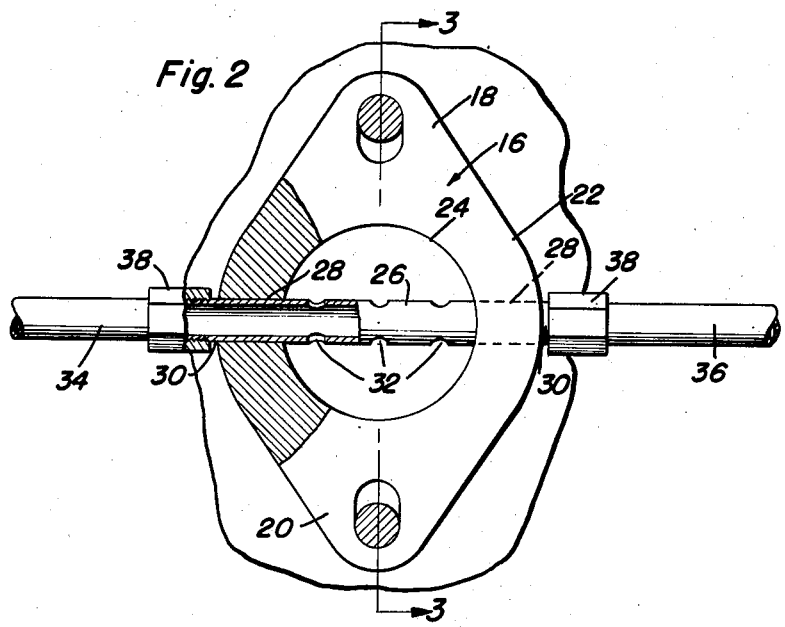
Figure 2 is an enlarged horizontal section, with parts in elevation and section, taken on the line 2—2 of Figure 1, looking in the direction of the arrows; and, Figure 3 is a longitudinal sectional view taken on the plane of the line 3—3 of Figure 2 showing the adapter and preheater and spray pipe per se.
Figure 3:
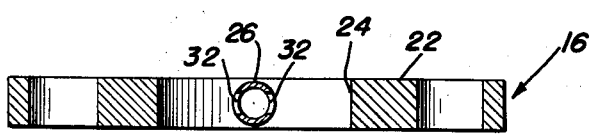

The invention resides, it is believed, in the combination shown in Figure 1 and the subcombination phases depicted in Figures 2 and 3 respectively.

Having thus described the invention, what is claimed as new is:

1. In a structural assemblage of the class described, in combination, an internal combustion engine including an exhaust manifold, an intake manifold and a carburetor, said intake manifold and carburetor having opposed flange means, an adapter plate bolted between the flange means, said adapter plate having a central opening for passage of fuel, a perforated tube mounted in said adapter plate and having its perforated portion spanning said opening, and individual forwardly and rearwardly directed branch pipes connected at corresponding ends with the respective end portions of said tube and communicatively connected at their opposite outer ends to said exhaust manifold.

2. In a structural assemblage of the class described, in combination, an internal combustion engine including an exhaust manifold, an intake manifold and a carburetor, said intake manifold and carburetor having opposed flange means, an adapter plate bolted between the flange means, said adapter plate having a central opening for passage of fuel, a perforated tube mounted in said adapter plate and having its perforated portion spanning said opening, and forwardly and rearwardly directed branch pipes connected with the respective end portions of said tube, the forward end of the forward pipe being joined with the exhaust manifold at a point in close proximity to the foremost cylinder in the engine, and the rear end of the remaining pipe being joined to the rear end portion of the exhaust manifold close to the rearmost cylinder in said engine.

3. For use in conjunction with an internal combustion engine which includes, as essential components, an exhaust manifold, an intake manifold and a carburetor operatively associated therewith, said intake manifold and carburetor having opposed flange means; a fuel preheating and mixing device adapted to be interposed between the stated flange means and comprising an adapter plate having a central opening and a perforated tube embodied in said plate and having its perforated portion in registry with said central opening and having end portions mounted in the marginal portions of the plate and projecting beyond said marginal portions, a forwardly disposable branch pipe and a separate rearwardly disposable branch pipe, said pipes being connected at their respective inner ends to the projecting end portions of said perforated tube, the forward end of the forward pipe being adapted to be joined with an exhaust manifold at a point in close proximity to the foremost cylinder in said engine, and the rear end of the remaining pipe being adapted to be joined to the rear end portion of the exhaust manifold close to the rearmost cylinder in said engine.

JOHN DAVID GODFREY.

REFERENCES CITED

The following references are of record in the file of this patent:

UNITED STATES PATENTS

| Number | Name | Date |
| --- | --- | --- |
| 1,170,788 | Walch | Feb. 8, 1916 |
| 1,382,285 | Harris | June 21, 1921 |
| 1,783,781 | Falk | Dec. 2, 1930 |